United States Patent Office 2,938,928
Patented May 31, 1960

2,938,928
P-BROMOBENZYL P-BROMOPHENYL SULFIDE

Herbert Aubrey Stevenson, Nigel George Clark, John Ray Marshall, Douglas Greenwood, John Ernest Cranham and Dennis John Higgons, Nottingham, England, assignors to Boots Pure Drug Company Limited, Nottingham, England, a British company No Drawing. Filed Feb. 2, 1955, Ser. No. 485,826

Claims priority, application Great Britain Feb. 18, 1954

1 Claim. (Cl. 260—609)

The invention relates to new benzyl phenyl sulphides which have been found to possess valuable properties.

More particularly the invention relates to the following new benzyl phenyl sulphides:

p-Bromobenzyl p-bromophenyl sulphide
p-Bromobenzyl p-chlorophenyl sulphide
p-Chlorobenzyl p-bromophenyl sulphide
p-Iodobenzyl p-fluorophenyl sulphide
p-Iodobenzyl p-chlorophenyl sulphide
p-Iodobenzyl phenyl sulphide
p-Iodobenzyl p-bromophenyl sulphide We have now found that dusts, dispersions, emulsions, smokes, mists and aerosols of the above new compounds have properties which render them valuable for the control of the eggs and active stages of mites (Acari) in particular the plant feeding Tetranychidae or red spider mites e.g. *Tetranychus telarius* L. and *Metateranychus ulmi* Koch. Our invention consists therefore in the above compounds and in dusts, dispersions, emulsions, mists, smokes and aerosols of these compounds which may be used for horticultural purposes.

The compounds according to the invention are obtained by reaction of the appropriately substituted benzyl halide and the corresponding appropriately substituted thiol in the presence of an alkaline condensing agent, such as sodium ethoxide.

The dispersions having a solid dispersed phase according to the invention may comprise the active ingredient in combination with a dispersing agent and/or a suspending agent in aqueous medium. For convenience the preparation may consist of active ingredient admixed with a dispersing agent and/or a suspending agent such that a dispersion is formed when the mixture is added to water. To facilitate the formation of a dispersion in this manner, the preparation to be diluted may also contain a water-miscible organic solvent, for example acetone. The dispersions according to the invention also include suspensions in which the solid dispersed phase is admixed with an aqueous oil emulsion, the active ingredient being substantially insoluble in the oil thereof, which oil is preferably a non-volatile oil, for example, liquid paraffin.

The emulsions according to the invention may comprise active ingredient in combination with an emulsifying agent and organic solvent, for example, xylene or an aromatic solvent boiling within the range 80–300° C. It may be advantageous to add a non-volatile vegetable or mineral oil such as liquid paraffin to act as an activator and/or a sticker. The emulsion composition according to the invention may also contain a wetting agent. For convenience the composition may consist of active ingredient admixed with or in solution in an organic solvent as hereinbefore specified together with an emulsifying agent, and if desired, a wetting agent such that an emulsion is formed on admixing the composition with water. Such compositions also form part of the present invention. The aqueous dispersions and emulsions herein described may be diluted with water before application to obtain a final concentration of active ingredient within the range 0.001–10% w./v. but the invention is not limited to compositions which contain this concentration of active ingredient; the concentration in the solutions which are employed depends upon the requirements of the particular spraying machine which is to be used.

Dispersions of active ingredient in which the base is a pulverulent solid diluent also form part of the present invention. Such dispersions may contain up to 50% w./v. of the active ingredient.

We have found that it is possible to employ the compounds of the above general formula in the form of smokes, mists and aerosols. This method of application is very convenient when the plants, which it is desired to treat for the control of the mites, are located in an enclosed area, for example, in a greenhouse.

Accordingly our invention also comprises compositions for the preparation of acaridical mists and aerosols which contain as active ingredient one of the above mentioned new benzyl phenyl sulphides.

In the preparation of mists and aerosols which contain as active ingredient one of the above mentioned new benzyl phenyl sulphides, the active ingredient may be dissolved in a mixture of a non-volatile oil, such as vegetable oil and a miscible supplementary solvent such as cyclohexanone or acetone. The solution so obtained may be dispersed by mechanical means or by incorporating in the solution a volatile propellant such as Freon (a mixture of chloro-fluoro derivatives of methane and ethane). The following non-limitative examples illustrate the invention:

Example 1

In the preparation of p-bromobenzyl p-bromophenyl sulphide 1.0 gram of sodium is dissolved in a mixture of 6.3 grams of p-bromophenylthiol and 100 ccs. of anhydrous ethanol. To the solution 6.9 grams of p-bromobenzyl chloride is added and the mixture is heated under reflux for 1.5 hours. The product is allowed to cool and is poured into 150 ccs. of water. The solid which separates is isolated by filtration and is recrystallised from aqueous alcohol. There is thus obtained p-bromobenzyl p-bromophenyl sulphide in the form of a crystalline solid which has a melting point of 106–107° C. (Found C, 43.9; H, 2.7; $C_{13}H_{10}Br_2S$ requires C, 43.6; H, 2.8.)

In a similar manner from the appropriate phenylthiol and appropriate benzyl halide, there is prepared the following compound.

p-Bromobenzyl p-chlorophenyl sulphide, M.P. 87–88° C. (Found C, 49.6; H, 3.05: $C_{13}H_{10}BrClS$ requires C, 49.8; H, 3.2.)

Example 2

In the preparation of p-chlorobenzyl p-bromophenyl sulphide, a solution of 3.2 grams of sodium hydroxide in 50 ccs. of anhydrous methanol is added to a hot solution of 10.9 grams of p-chlorobenzyl chloride and 13.5 grams of p-bromophenylthiol in 50 ccs. of anhydrous methanol. After addition, the mixture is heated under reflux for 30 minutes. Most of the solvent is removed by distillation and excess cold water is added to the residue. The precipitated solid is isolated by filtration and is recrystallised twice from ethanol. There is thus obtained p-bromophenyl p-chlorobenzyl sulphide in the form of a crystalline solid which has a melting point of 87–88° C. (Found C, 49.6; H, 3.2: $C_{13}H_{10}BrClS$ requires C, 49.8; H, 3.2.)

In a similar manner, from the appropriate phenylthiol and the appropriate benzyl halide, there are prepared p-Chlorophenyl p-iodobenzyl sulphide, M.P. 101° C. (Found C, 43.5; H, 2.8: $C_{13}H_{10}ClIS$ requires C, 43.3; H, 2.8.)

p-Fluorophenyl p-iodobenzyl sulphide, M.P. 54.5–56°

C. (Found C, 45.3; H, 3.0: $C_{13}H_{10}FIS$ requires C, 45.3; H, 2.9.)

p-Iodobenzyl phenyl sulphide M.P. 87–88.5° C. (Found C, 48.0; H, 3.3: $C_{13}H_{11}IS$ requires C, 47.9; H, 3.4.)

p-Bromophenyl p-iodobenzyl sulphide M.P. 117–118° C. (Found C, 38.8; H, 2.4: $C_{13}H_{10}BrIS$ requires C, 38.5; H, 2.5.)

*Example 3*

In the preparation of a dispersible powder, 20 parts by weight of p-bromobenzyl p-bromophenyl sulphide is intimately mixed with 8 parts by weight of Belloid T.D. (a condensate of formaldehyde and an alkyl aryl sulphonate) and 72 parts by weight of kaolin. This composition may be added to water to form a stable dispersion suitable for horticultural use.

*Example 4*

In the preparation of a composition suitable for dilution with water to obtain a stable emulsion, sufficient p-chlorobenzyl p-bromophenyl sulphide is dissolved in a mixture of 10 parts by volume of Insem 108 (a proprietary non-ionic emulsifying agent which is believed to be an oleic acid ester of a glycol) and 90 parts by volume of benzene to obtain a solution which contains 5% w./v. of active ingredient.

*Example 5*

In the preparation of a composition suitable for dilution with water to obtain a stable emulsion, sufficient p-iodobenzyl phenyl sulphide is dissolved in a mixture of 10 parts by volume of Insem 108 (a proprietary non-ionic emulsifying agent which is believed to be an oleic acid ester of a glycol) and 90 parts by volume of benzene to obtain a solution which contains 10° w./v. of active ingredient.

Similarly dispersions and compositions as described in Examples 3, 4 and 5 may be prepared in which the active ingredient specifically mentioned is replaced by any of the compounds listed in Examples 1 and 2.

What is claimed is:

p-Bromobenzyl p-bromophenyl sulphide.

References Cited in the file of this patent

UNITED STATES PATENTS 2,159,025   Hester _____ May 23, 1939

OTHER REFERENCES

Beilstein Organische Chemie, vol. 6, p. 454.

Chem. Abst. vol. 2 (1908), col. 3331.

Chem. of Insecticides, Fungicides and Herbicides, Frear, 2nd ed., 1948, pp. 5 and 6.

"Synthesis of Some Simple and Mixed Ethers as Contact Insecticides," by Tien Chih Chen et al., J. of the Am. Chem. Soc., vol. 73, pp. 4694–4696 (1951).

"p-Chlorobenzyl p chlorophenyl sulfide," by Cranham et al., Chem. and Ind., Nov. 7, 1953, pp. 1206 and 1207.

"Synthesis of p benzylmercaptobenzenearsonic acid," Takahsshi Chem. Abst., vol. 30, col. 721 (1936).